Aug. 13, 1935.  G. D. POGUE  2,010,960
ALARM AND CONTROL SYSTEM FOR INTERNAL COMBUSTION ENGINES
Filed March 20, 1934   7 Sheets-Sheet 1

INVENTOR
George D. Pogue
by his attorneys
Byrnes, Stebbins & Blenko

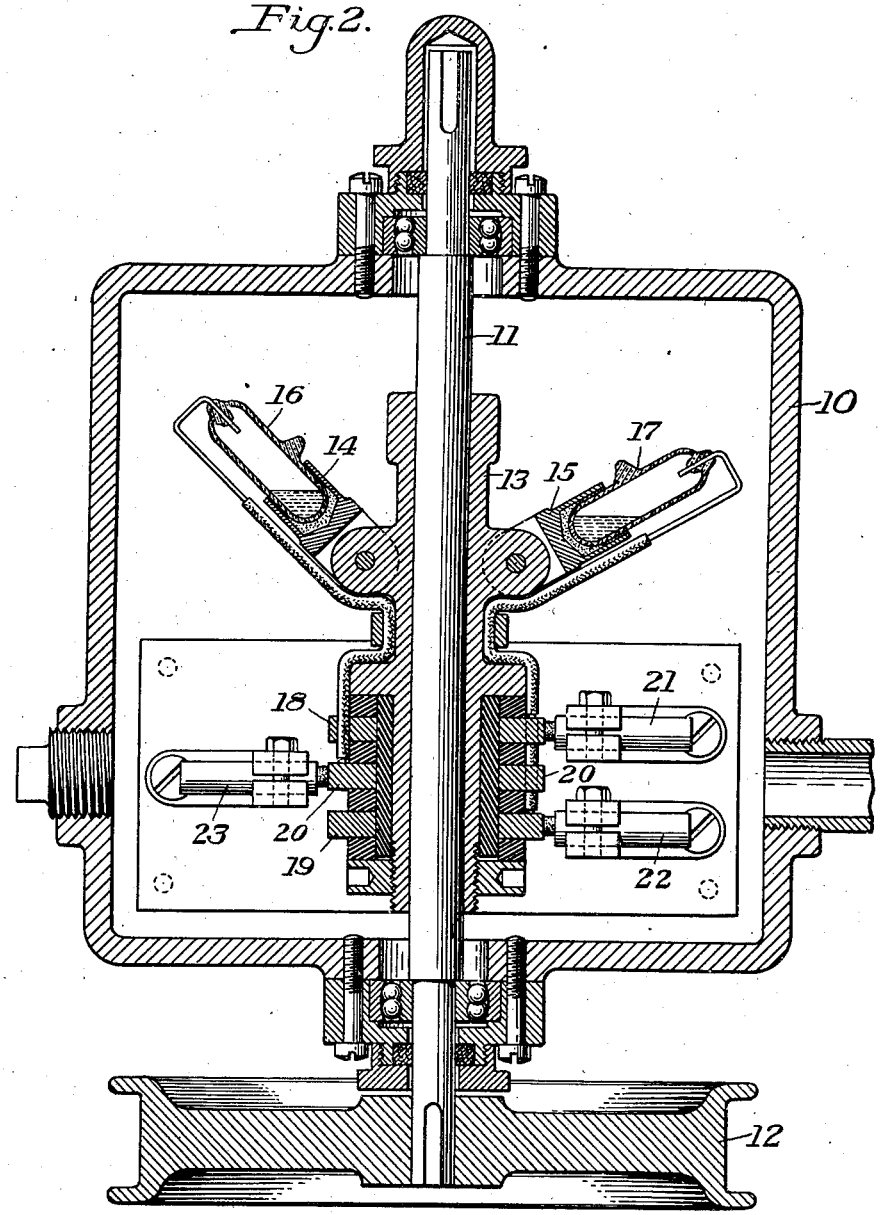

Aug. 13, 1935.  G. D. POGUE  2,010,960
ALARM AND CONTROL SYSTEM FOR INTERNAL COMBUSTION ENGINES
Filed March 20, 1934   7 Sheets-Sheet 3
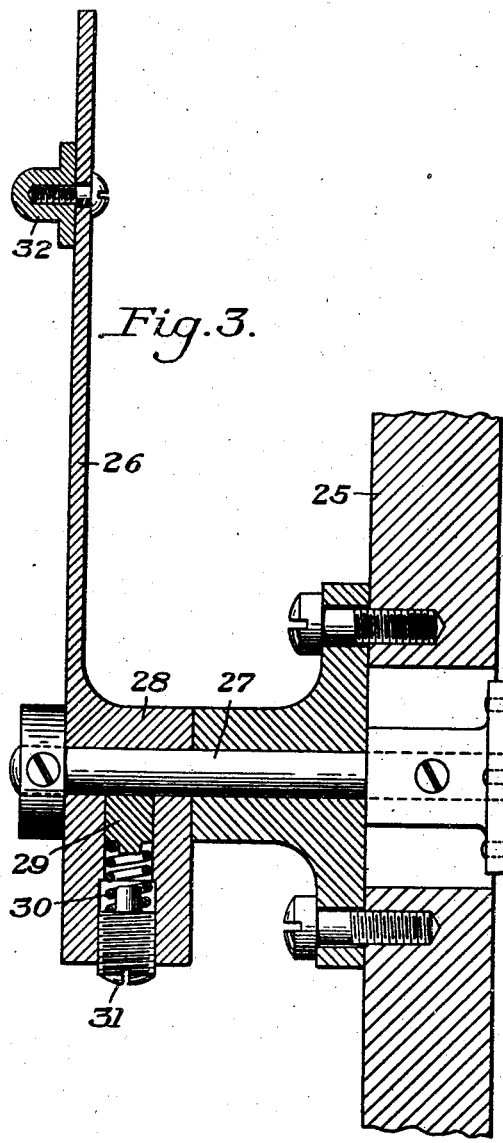
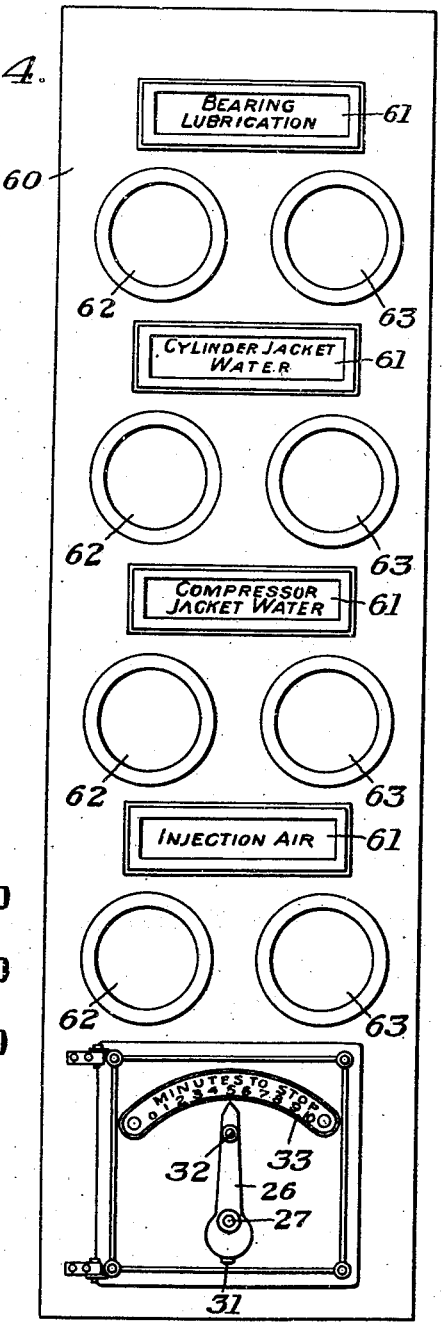

Aug. 13, 1935.  G. D. POGUE  2,010,960
ALARM AND CONTROL SYSTEM FOR INTERNAL COMBUSTION ENGINES
Filed March 20, 1934  7 Sheets-Sheet 4
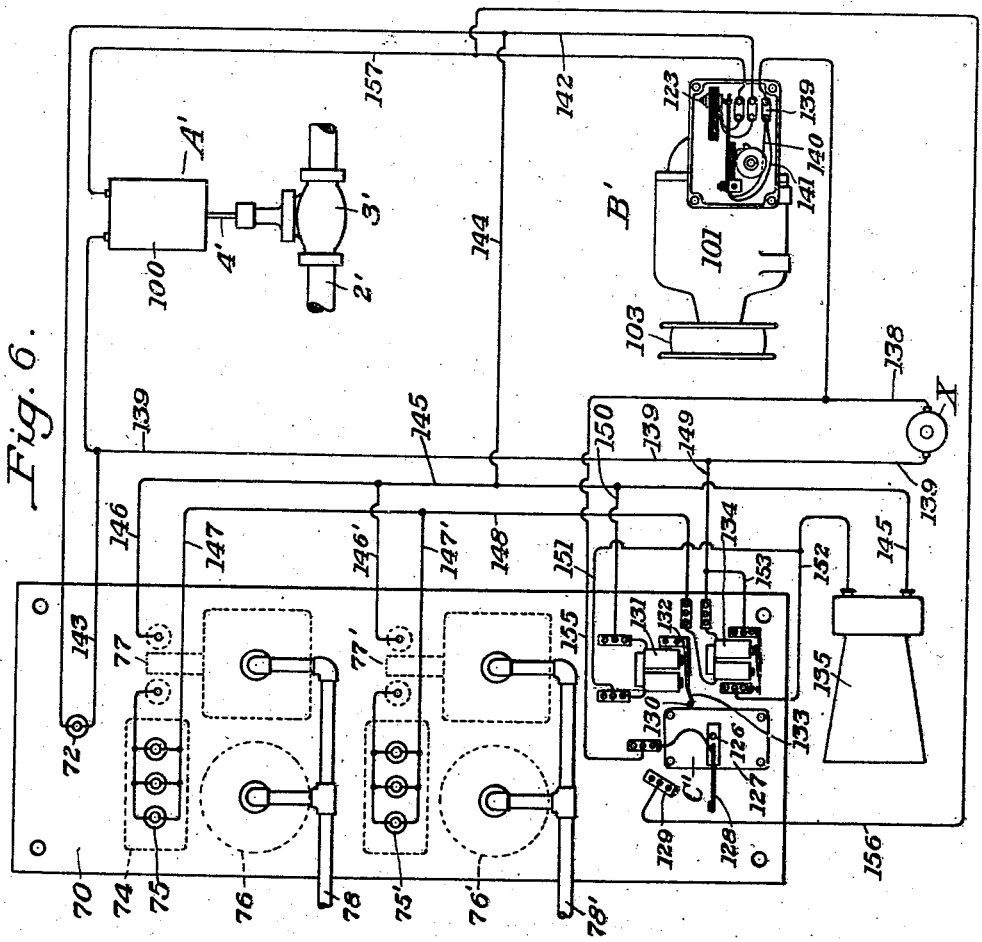
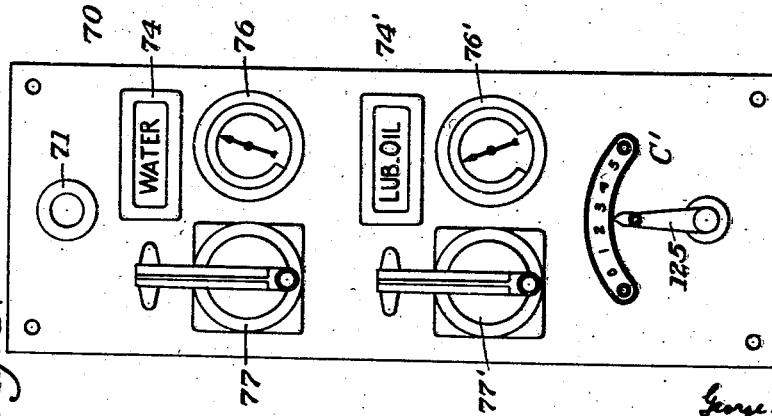
INVENTOR
George D. Pogue
by his attorneys
Byrnes, Stebbins & Blenko

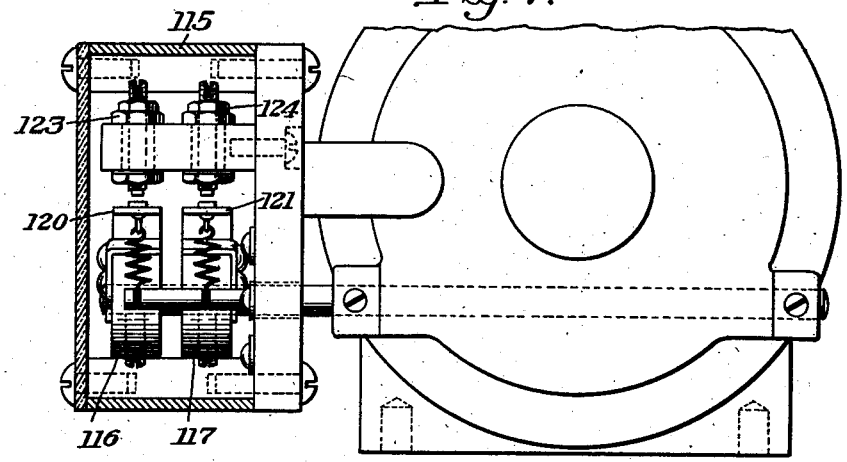
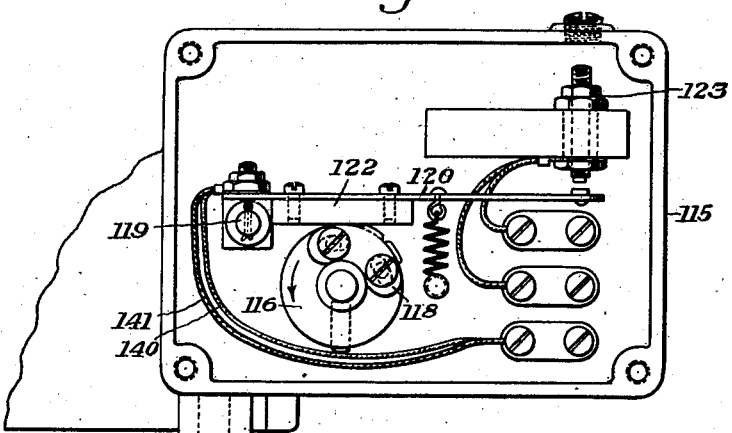
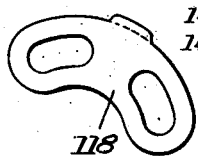
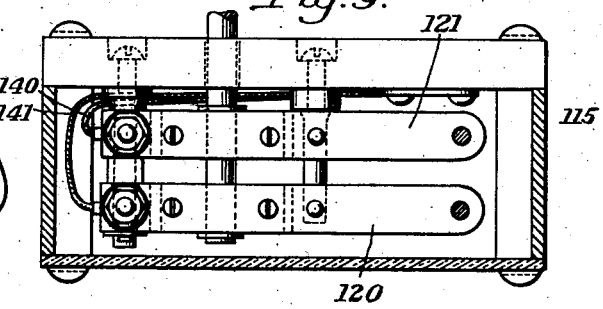

Aug. 13, 1935.   G. D. POGUE   2,010,960
ALARM AND CONTROL SYSTEM FOR INTERNAL COMBUSTION ENGINES
Filed March 20, 1934   7 Sheets-Sheet 6
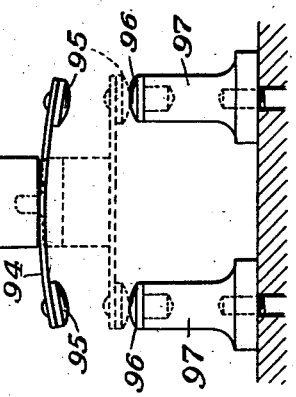
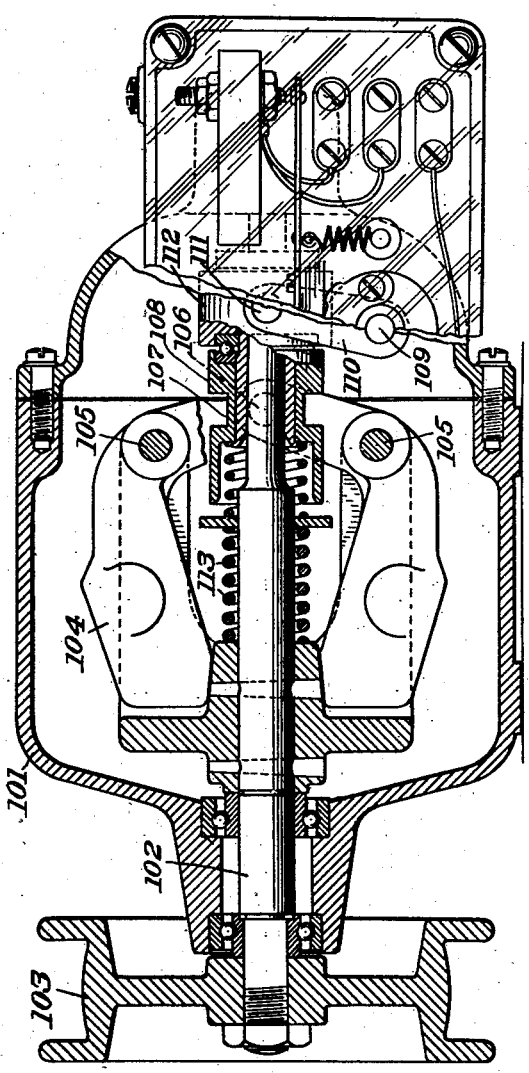
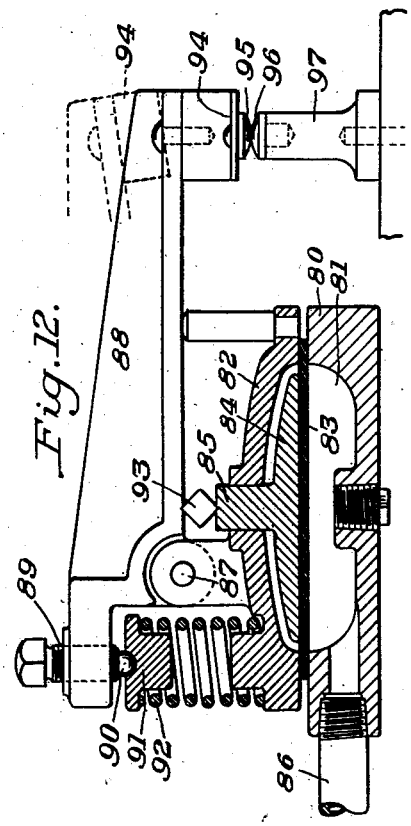
INVENTOR Aug. 13, 1935. G. D. POGUE 2,010,960
ALARM AND CONTROL SYSTEM FOR INTERNAL COMBUSTION ENGINES
Filed March 20, 1934 7 Sheets-Sheet 7
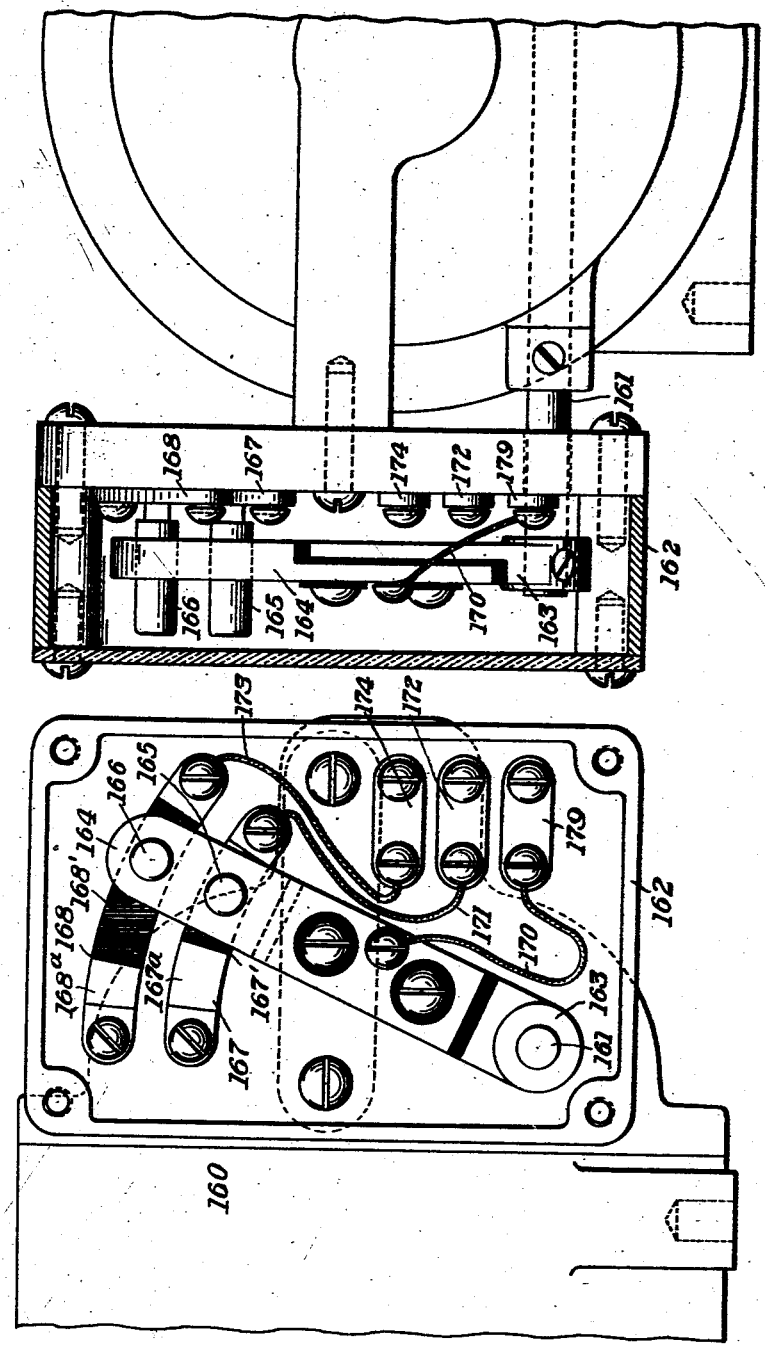
INVENTOR
George D. Pogue
by his attorneys Patented Aug. 13, 1935

2,010,960

UNITED STATES PATENT OFFICE 2,010,960

ALARM AND CONTROL SYSTEM FOR INTERNAL COMBUSTION ENGINES

George D. Pogue, New York, N. Y., assignor of one-half to Brooke L. Jarrett, Pittsburgh, Pa.

Application March 20, 1934, Serial No. 716,460

45 Claims. (Cl. 123—198)

This invention relates to the operation of internal combustion engines, and is particularly applicable to the operation of internal combustion engines of the Diesel type. The present application constitutes a continuation-in-part of my earlier filed application, Serial No. 573,711, filed November 7, 1931.

In the operation of Diesel engines, there is a maximum speed beyond which it is both unsafe and undesirable for the engine to operate. Such overspeeding of the engine is generally due to some condition which demands that the engine be stopped at once. Certain other conditions arise in the operation of the engine which require that the engine be stopped if the condition is not remedied within a reasonable length of time. For instance, if there is a failure of lubrication, or the pressure of the lubricant falls below a point of safety, the engine may operate for a few minutes without danger, but if the cause of the failure of lubrication is not remedied within a few minutes, the engine should be stopped.

Other conditions of fault may also be remedied within a reasonable time while the engine is running, but if they are not remedied the engine should be stopped. In addition to failure of lubrication some of the other conditions are,—cooling water to the engine cylinders; failure of cooling water to the air compressors; or failure of air pressure for injection of fuel.

The present invention provides a mechanism wherein the overspeeding of the engine will result in the engine being stopped, and this is preferably effected through the source of air supply to the engine cylinders. The invention further contemplates that upon failure of other essential functions, such as those noted above, i. e., failure of lubrication, etc., switch mechanism will be put into operation for shutting off the engine after a predetermined lapse of time, there being an alarm and signal system to give notice instantly of the failure of any of these functions, whereby the attendant will be notified of the failure several minutes in advance of the time when the engine will shut off, and be given an opportunity to correct the failure before the engine does shut off. If the fault is corrected within the predetermined time period, the operation of the time switch will be halted and the parts restored to a normal operating condition.

The invention may be understood by reference to the accompanying drawings in which Figure 1 is a schematic diagram illustrating the general scheme of the invention;

Figure 2 is a detail view showing a vertical section through the speed-responsive unit of the system;

Figure 3 is a detail view of the time switch lever and indicator;

Figure 4 is a front view showing how the various indicating devices may be conveniently disposed on a control panel;

Figure 5 shows a modified panel arrangement with a type of pressure responsive switch different from that shown in Figure 1;

Figure 6 is a more or less schematic view showing the back of the panel of Figure 5, showing a somewhat modified circuit arrangement and a different form of speed-responsive circuit closing device;

Figure 7 is a detail view showing the end of another form of speed-responsive circuit closing device, together with circuit closing contactors, a portion of the housing for the contactors being shown in section;

Figure 8 is a detail view of the circuit closing arrangement of Figure 7, one side of the housing being removed;

Figure 9 is a section in the plane of line IX—IX of Figure 8;

Figure 10 is a detail view of the adjustable cam nose forming part of the circuit closing cams;

Figure 11 is a sectional view showing the governor housing in section, the circuit closing device being shown in elevation;

Figure 12 is a longitudinal sectional view showing a modified form of pressure responsive switch;

Figure 13 is an end view of the switch shown in Figure 12;

Figure 14 is another detail view showing still a further modified arrangement for the speed-responsive circuit closing contacts; and Figure 15 is a transverse section through the mechanism shown in Figure 14, the view being substantially in the plane of line XV—XV of Figure 14.

Figure 1:
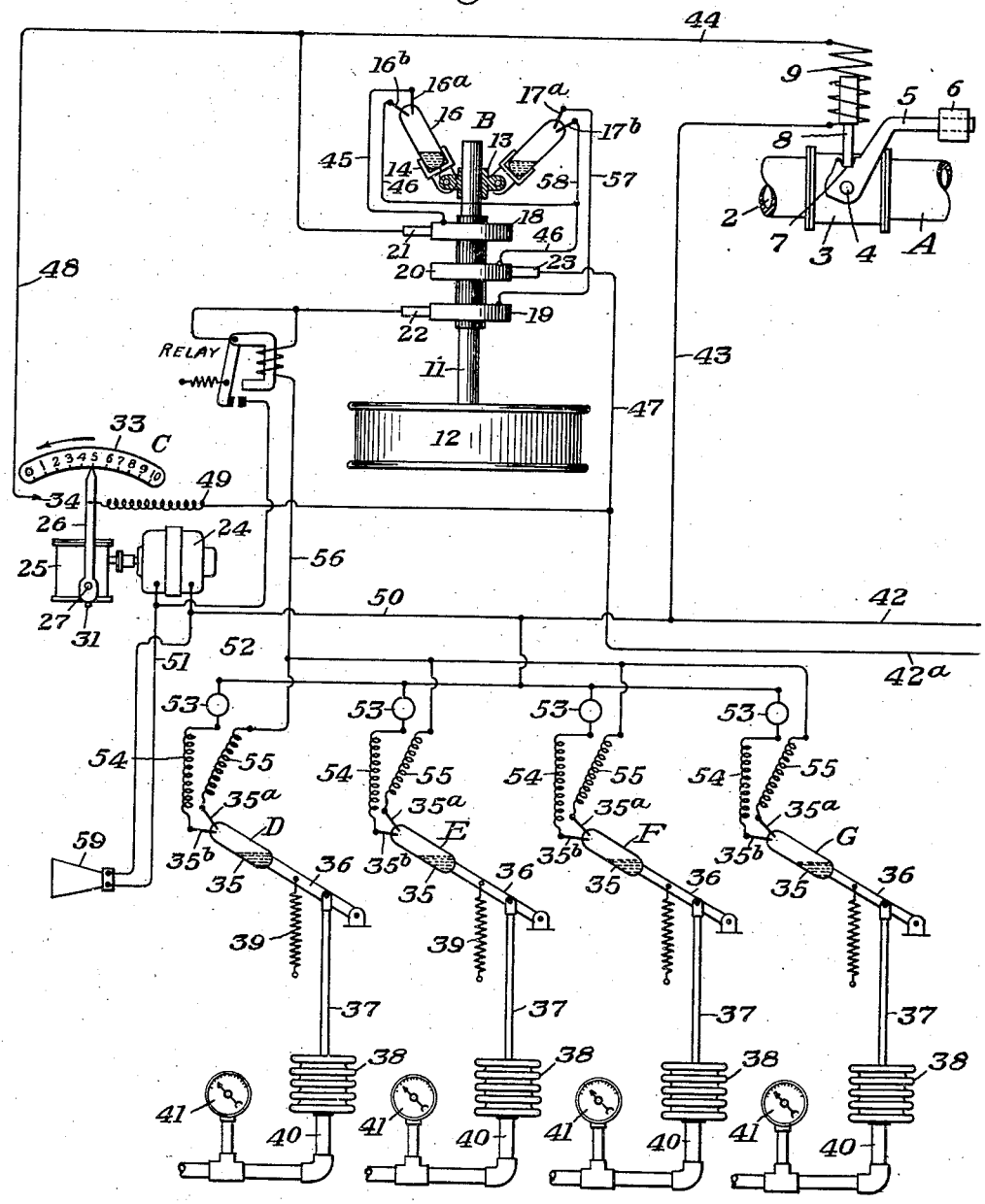

In the drawings, which illustrate a present preferred embodiment of the invention, A designates the engine control unit; B is the speed-responsive unit; C is the time switch; and D, E, F and G designate pressure-responsive circuit-closing units.

I will first describe the control unit A. In the specific embodiment shown, 2 designates an air intake pipe comprising part of a Diesel or internal combustion engine. In this air intake pipe is a valve body 3. Within the body is a valve of any preferred construction having a shaft 4 with an operating lever 5. The outer end of the lever 5 is weighted as indicated at 6. At 7 is a detent in which a latch or trigger 8 engages for normally holding the valve in open position. The latch 8 is operatively connected with the armature of an electromagnet. I have shown the electromagnet as comprising a solenoid 9.

The speed-responsive unit B is shown in the diagram in Figure 1 and in detail in Figure 2. It comprises a housing 10 within which is a vertical shaft 11, the shaft being supported in bearings at each end of the housing, and on the lower end of the shaft is a pulley 12 which is belted or geared to the engine to be controlled. Mounted on the shaft 11 within the casing 10 is a hub 13. Supported on the hub 13 is a metal cup 14 and opposite the cup 14 is a similar cup 15. These two cups form sockets for mercury tubes 16 and 17, respectively. Each mercury tube comprises a glass vessel having a body of mercury therein and having two contacts in the outer end thereof. When the mercury tubes are revolved at sufficient speed the mercury is thrown out by centrifugal force, closing the gap between the contacts to complete an electric circuit as hereinafter more fully described.

It will be noted that the mercury tube 17 is set at an angle more nearly approaching the horizontal than is the mercury tube 16. Because of the greater inclination of the tube 16, the shaft 11 must revolve faster before the circuit through the contacts at the end thereof is closed by the mercury.

The hub 13 also carries three contact rings 18, 19 and 20, these rings being electrically insulated from one another. Supported in the housing 10 for cooperation with these rings 18, 19 and 20 are brushes 21, 22 and 23, respectively. These contact rings and brushes are included in an electrical circuit, which also includes the tubes 16 and 17, as will be hereinafter more fully described.

The time switch unit C comprises an electric motor 24, a speed reducing gear 25, and a switch arm and indicating lever 26 which is mounted on shaft 27 driven through the speed reducer. In Figure 3 the construction of this arm 26 is shown in detail. The pointer or arm 26 has a hub portion 28 through which the shaft 27 passes. This hub portion has a friction key or shoe 29 therein which is urged into contact with the shaft 27 by means of a compression spring 30, the spring being held under pressure by a set screw 31. This slip key or shoe provides a driving connection between the shaft 27 and the pointer 26 of such nature that the pointer will ordinarily be moved upon rotation of the shaft 27, but the pointer may be rotated on the shaft to be set in a predetermined position. For setting the pointer a knob 32 is conveniently provided near the end of the pointer. Positioned along the path of movement of the pointer is a graduated segment 33 having a series of numbers thereon, which numbers apply to graduated markings on the segment. When the motor 24 is operating it takes one minute for the pointer to travel from one marking to the next, the pointer moving in the direction of the arrow in Figure 1. The numbers on the graduated segment therefore designate minutes of time. The pointer 26 is a conductor, and a contact is provided at 34, as shown in Figure 1, against which the pointer may move when it is at the limit of its travel in the direction of the arrow to close a circuit, as hereinafter more fully described.

Each of the pressure responsive units D, E, F and G are the same and like reference numerals have been used to designate the corresponding parts. It will be understood that the showing in Figure 1 of these units is purely diagrammatic. Each unit comprises a mercury tube 35 having a pair of contacts therein, these contacts being designated 35a and 35b. The tubes are supported for tilting movement on a pivoted carrier 36. This carrier 36 is actuated through a connection 37 from a pressure responsive element, such as a Bourdon type expansion element 38. A spring 39 acts in opposition to the pressure responsive expansion element 38. The numeral 40 designates a pipe through which fluid pressure is communicated to the element 38, and 41 is a visible pressure gauge for indicating the pressure in the element 38.

With this discussion of the apparatus, the circuits which correlate the various elements may now be described. It will of course be appreciated that instead of direct coupled circuits being used, it is within the skill of an electrician to substitute relay circuits where it is desirable to use currents of low magnitude in the control elements themselves. The circuit through the solenoid 9 is to be closed at once upon overspeeding of the engine and is to be closed after a lapse of time upon failure of anyone of several different functions, as hereinbefore stated. For energizing the magnet 9 upon overspeeding of the engine, the circuit may be traced from one side of a current supply line 42 through wire 43, solenoid 9, wire 44, brush 21 of the speed-responsive unit B, ring 18 and wire 45, to contact 16a of mercury tube 16. The other side of the circuit comprises mercury tube contact 16b, wire 46, the middle slip ring 20, brush 23, and wire 47 back to the outer side of the current supply line 42a.

When the shaft 11 is revolving at such speed that the mercury in the tube 16 is thrown out to the end of the tube, the solenoid 9 will be energized to lift the latch armature 8 out of the detent 7, whereupon the weighted lever 5—6 will drop down to close the air intake valve to the engine. While it is obvious that instead of cutting off air intake some other function of the engine could be controlled, it is especially desirable that the engine may be stopped through the cutting off of the air to the cylinders. For instance, the air in an engine room may become highly charged with hydrocarbon vapors, as for instance, from the breaking of a gas pipe. If the valve 3 were in the fuel line it will be seen that even after the fuel supply were shut off the engine would continue to draw in carbureted air from the engine room and operate on this mixture. This is particularly likely to happen in the case of a high compression engine such as a Diesel engine. The shutting off of the air supply, instead of controlling the engine in any other way, therefore has particular advantage.

The other circuit for energizing the solenoid 9 is from one side of the current source of supply 42, through wire 43, solenoid 9, wire 44 and wire 48, to contact 34. The other side of the circuit comprises the indicator switch arm 26, wire 49 and wire 47 back to the other side of the source of current supply 42a. It will be seen that the solenoid 9 can be energized through this circuit only when the motor 24 has been energized to move the switch arm 26 into contact with the contact 34. The circuit for the motor 24 comprises wire 50 leading from one side of the current supply 42 to the motor 24, through the motor 24 to wire 51 and wire 52. The various units D, E, F and G are in parallel, and the circuit may be similarly traced through any one of these units. From wire 52 the circuit leads through an indicator lamp 53 and a flexible connection 54 to mercury tube contact 35b. The other side of the circuit is from mercury tube contact 35a through flexible connections 55, wire 56, brush 22, slip ring contact 19, wire 57, to one of the mercury tube contacts 17a. A circuit is completed by mercury tube contact 17b, mercury tube 17, wire 58, wire 46, slip ring contact 20, brush 23, and wire 47 back to the other side of the line 42a. While there is a separate indicator lamp 53 for each of the units D, E, F and G, the circuit may include also an electric horn or audible signal 59 in parallel with the motor 24. The operation for this part of the circuit may now be followed. For the purpose of illustration, it may be assumed that pipe 40 and gauge 41 of unit D respond to pressure in the lubricating system of the engine. Gauge 41 and pressure responsive element 38 of unit E respond to pressures in the cylinder cooling water system. The unit F responds to water pressure for cooling the compressors, while unit G responds to the pressure of the air for fuel injection. When the engine is started, some or all of these pressures may be below normal. The arrangement of the mercury tubes D is such that when pressure in the expansion element 38 is below normal, the tube 35 is tilted down to a position where the mercury in the tube closes the gap between the contacts 35a and 35b. When the pressure increases to normal, the position of the tube is elevated to a point where the circuit is open between the contacts 35a and 35b. Assuming first that the pressures are normal and the engine is operating at normal speed, the mercury in the tube 17 closes the contact between 17a and 17b, but the circuit in the motor 24 is not completed because with normal pressures in the expansion elements 38 of units D, E, F and G, the mercury tubes 35 are elevated and the circuit is broken between contacts 35a and 35b. If, however, pressure in one of these elements drops below normal, the tube 35 drops down, completing the circuit through the motor 24 and also through the visual signal 53 and the audible signal 59.

Thus with a failure of pressure in any one of the units, an audible signal is sounded to attract the attention of the operator, a visual signal is displayed showing just which function is at fault, and the motor 24 starts to move the switch arm 26 toward the contact 34. The machine attendant is thus given a period of time in which to attempt to correct the faulty apparatus before the switch lever 26 engages the contact 34 to energize the solenoid 9 and stop the engine. This lapse of time also gives the attendant an opportunity to start an emergency unit in the event he sees that the fault cannot be corrected within the allotted time. The numbers on the segment 33 are so positioned as to show the number of minutes that the machine will continue to operate. If the fault is corrected before the arm 26 reaches contact 34 and normal pressure restored in that expansion element 38 in which it had dropped, the motor circuit will be broken by the raising of the mercury tube 35. The operator may then take hold of the knob 32 and reset the indicator switch arm 26 to its normal starting position, the slip key 29 permitting this resetting of the arm.

As previously stated, when the machine is started up, the pressure in one or more of the units is apt to be below normal and is not built up until the engine has attained its operating speed. If it were not for the mercury tube 17, the motor circuit 24 would be closed when the machine is stopped or when it is just starting, and before normal pressures have been reached. Since, however, the circuit of the motor 24 is only closed when the mercury in tube 17 immerses the contacts 17a and 17b, the motor cannot be energized until the shaft 11 has reached a predetermined speed of rotation. If by the time the shaft 11, driven from the engine, reaches its normal operating speed the pressure in one or more of the units 38 has not been built up to normal, the circuit through the motor 24 will be closed, because if, when the engine speed gets up to normal, pressure in any of the units D, E, F and G is not up to normal, something is the matter requiring attention.

In Figure 4 I have indicated how the various indicating and pressure responsive elements are mounted on a control panel. In this view, 60 designates a panel having a plurality of transparent signs 61 thereon, which signs have appropriate lettering and behind which the signal lamps 53 for the respective units are located. The circular cases, designated 62, are adapted to house the pressure gauges 41 while the circular cases 63 house the pressure responsive mercury tube devices, these being constructed in a very compact manner, which is at present known to the art. The time switch unit C is located in the base of the panel, as indicated at 64, there being a hinged glass door through which the indicator is visible and through which access may be had to the indicator 26 for resetting it.

The system provides for the complete supervision of an internal combustion engine power plant, affording instant stoppage against overspeed and affording signals against various failures, such as failure of the power plant, with the stopping of the power plant in a predetermined time if such failures are not corrected, and before the engine has operated long enough to do any serious damage. The number of units D, E, F and G may be varied according to the number of different parts of the power plant that the system is to be made responsive to. The system, moreover, prevents premature operation of the switch 26—34 in starting the power plant into operation, because of the fact that the speed responsive unit must be up to a normal speed before the circuit to the motor 24 can be completed.

While the arrangement described is highly practical, particularly for stationary power plants, the use of fluid switches is less desirable for portable power plants, especially the power plants used on boats and other floating equipment. The arrangement shown in Figures 5 to 13, inclusive, illustrate a somewhat more simple and more practical embodiment of the invention, and one which is more useful for power plants, on vehicles, and on boats and other floating units. In the embodiment shown in Figures 5 to 13, inclusive, I have illustrated the panel as having a fewer number of pressure responsive switches than in the system previously described, but it will be understood that the number of switches can be increased and varied according to the needs of any particular installation.

In Figures 5 and 6, the numeral 70 designates the control panel. It is provided at the top with a window 71 for a pilot light. 72 designates the support for the pilot light. Below the pilot light is a window 72 which may bear a suitable legend, as described in connection with Figure 4. Back of this window are one or more sockets 74 and 75 having lamps therein. Under the window 74 is a pressure gauge or indicator 76, and beside the pressure indicator is a pressure-responsive circuit closer 77. The two pressure-responsive devices 76 and 77 are connected to a common pipe 78 that may lead to the source of fluid pressure to which the switch 77 is intended to respond. For example, it may lead to the source of water supply for the cooling system of the engine to be controlled.

Similar arrangements may be duplicated on the panel. For instance, in Figures 5 and 6, there is a second window 74', a second pressure gauge 76', a second pressure switch 77', and lamps 75'. The pressure gauge and the pressure-responsive switch 76' and 77', respectively, are connected to a common pipe 78' which leads to another source of fluid pressure supply important in the operation of the engine to be controlled, as for instance, the source of lubricating pressure.

On the panel below the mechanism described, there is a time switch unit C' corresponding generally to the unit C of Figure 1.

The system includes in addition to the panel and the time switch unit, a mechanically operated valve A' corresponding to the valve A of Figure 1 and the speed-responsive circuit closer B' corresponding in function to the speed-responsive circuit closer B of Figure 1.

The pressure-responsive switches 77 and 77' are shown in detail in Figures 12 and 13. Each switch comprises a body member 80 having a chamber 81 therein. The body member is provided with a cover 82 and confined between the cover and the member 80 is a relatively heavy rubber or other flexible diaphragm 83. Resting on the top of the diaphragm 83 is a disc 84 having a stem 85 projecting through an opening in the cover 82. The chamber 81 is provided with a fluid pressure inlet opening 86. Carried on the cover member 82 is an upright support 87 on which is pivotally carried a lever 88, one arm of which is preferably considerably longer than the other arm. The shorter arm has an adjusting screw 89 thereon which bears against a spherical surface 90 on a member 91 supported by a compression spring 92. The compression spring 92 is retained on the cover 82. The projection 85 on the disc 84 carries a bearing member 93 which contacts with the under side of the long arm of the lever 88 close to the pivot point of the lever. The outer end of the arm carries a transversely extending metallic spring 94 having contact buttons 95 at the opposite ends thereof. These contact buttons are adapted to cooperate with contact surfaces 96 on a pair of connector posts 97. The spring 94 constitutes a conductor from one contact 95 to the other. The device, in effect, provides a single pole double-contact switch.

When a normal fluid pressure is maintained in the chamber 81, the diaphragm 83 is flexed upwardly, lifting the disc 84, raising the long arm of the lever 88 against the compression of the spring 92 to a point where the contact buttons 95 are free of the contact surfaces 96. The throw of the switch lever is limited by the clearance provided between the top of the disc 84 and the inside of the cover 82. When the pressure in the chamber 81 falls below a predetermined minimum, the spring 92 bearing up on the short arm of the lever 88 forces the long arm of the lever down to circuit closing position. The throw of the lever is adjusted so that as the contact buttons 95 bear against the buttons 96, the spring 94 will be flexed very slightly to the straight line position indicated in dotted lines in Figure 13. This flexing of the spring 94 causes a slight movement of the contacts 95 on the surface 96, assuring that a good electrical contact will be made when the switch closes.

It will be observed that the switch is moved to open position by the maintenance of a fluid pressure in the chamber 81 while the compression spring 92 opposes the opening movement and biases the switch to close when the pressure in the chamber falls below a predetermined minimum. The switch can be set to operate in any position, not being responsive to gravity and not depending upon any liquid for closing the contacts, it is not affected by any rocking movement such as is encountered on boats and the like. Adjustment of the screw 89 provides for the proper predetermined relation between opening pressure and the closing pressure for the switch, inasmuch as adjustment of the screw varies the pressure on the spring 92.

It will be seen that these switches may be substituted for the mercury switches of Figure 1 above described.

The magnetic valve unit A' is illustrated as being of a well known commercial construction forming no part of the present invention. In this respect, it is slightly different from the arrangement shown in Figure 1 wherein the counterweighted lever is held by an electromagnetically operated trigger. In Figure 6, 2' corresponds to the pipe 2 of Figure 1. The valve is designated as 3'. It has a stem 4'. I have conventionally indicated at 100 a casing within which is an electromagnet for closing the valve whereby the valve is made direct acting instead of employing a gravity lever as shown in Figure 1. As previously stated, electromagnetic valves of this type are common in the art and form no part per se of the present invention.

The speed-responsive unit B' is arranged to perform the same function as the unit B of Figure 1. However, in the unit B', mercury contacts have been eliminated, and the unit responds entirely to the speed at which the unit is driven. Since it does not depend upon mercury or other fluid, it can be more satisfactorily used on boats and in other portable power plants than can the arrangement shown in Figure 1.

The unit B' comprises a speed-responsive unit using centrifugal weights. The particular construction of the governor per se forms no part of the invention. The specific governor illustrated in Figure 11 is known as "Class 1800" manufactured by Pickering Governor Co., of Portland, Conn. It comprises a casing 101 in which is a rotatable shaft 102 having a pulley 103 at its outer end which is adapted to be driven from the engine to be controlled. The shaft carries centrifugally responsive weights 104 pivotally supported at 105. The weights 104 are essentially in the shape of bell cranks and they are provided with pins 106 which engage an annular groove 107 in a collar 108. Carried on the inner end of the shaft 102 passing through the upper part of the casing 101 is a transverse shaft 109. It is provided with an arm 110, the arm 110 having a pin 111 that engages in an annular groove in the member 112 associated with the collar 108. The arrangement is such that when the weights 104 move out under the influence of centrifugal force, the collar 108 will be moved to the left as viewed in Figure 11, against the compression of compression spring 113. This reciprocable movement of the member 108 causes the member 112 to move to a similar extent, and the movement of the member 112 is transmitted to the shaft 109 which is rocked through an arc corresponding to the degree of movement of the collar.

According to the present invention, I provide a casing 115 on the outside of the governor casing 101, and the end of the shaft 109 extends into this casing. On this shaft there are two cam bodies 116 and 117 each of which is adjustable on the shaft and each of which has an adjustable cam nose member similar to the member 118 of Figure 10. Pivotally supported within the casing 115 on a transverse pin 119 are two spring contact members 120 and 121. The member 120 extends over the cam 115 and the member 121 extends over the cam member 117. The spring contact members 120 and 121 are provided with wearing blocks 122 formed of insulating material. Positioned over the free ends of the spring contact arms 120 and 121 are adjustable contact members 123 and 124, contact 123 being over the arm 120 and contact 124 being over the arm 121.

The arrangement is such that when the shaft 109 is rotated in a counter-clockwise direction, as it is when the engine comes up to speed, the cams 116 and 117 will be rotated. The cam 117 is slightly out of phase with the cam 116 and is rotated with respect to cam 116. The setting of the cams is such that when the engine reaches approximately 80% of its normal speed, the contact arm 120 will be lifted to make contact with the contact 123. This contact will be maintained when the engine reaches normal speed. If the engine goes above normal speed, cam 117 will be rotated to a position where it lifts the contact 121 into engagement with the contact member 124. The two cams and their contact arms are arranged to perform the same function as the two mercury tubes in the unit B of Figure 1. Adjustment for the critical speed at which each contact is to become operative may be determined first by the setting of the member 116 or 117 on the shaft 109, and further adjustment can be obtained by the adjusting of the nose member 118 with respect to the cam body on which it is mounted. As shown in Figure 10, the nose member 118 is provided with arcuate slots to enable adjustment of this member with respect to the screws which hold it on the cam body. Adjustment of the cams gives the same range of control that adjustment of the angles of the mercury tubes gives in the unit B of Figure 1.

I have also shown in Figure 6 a slightly different time switch arrangement from that described in connection with Figure 1. On the front of the panel 70, there is a graduated segment similar to that shown in Figure 4. It is preferably graduated in numerals indicating the minutes, as previously explained in connection with Figure 1. On the front of the panel 70, there is an indicating arm 125 corresponding to the indicator 26 of Figure 1. The arm 125 is carried on a shaft 126 driven by a clock mechanism 127. This clock mechanism is conventionally indicated in Figure 6. The shaft 126 also carries a contact arm 128 adapted to move toward a stationary contact 129. The clock may be an electrically operated clock or a spring-operated clock. Its operation is controlled by a trip lever 130. Mounted on the back of the panel is an electromagnet 131 having an armature 132 with a projection 133 thereon engaging under the detent 130. When the electromagnet 131 is energized, the armature 132 is lifted, raising the detent 130 to set the clock into operation.

Below the electromagnet 131 I have shown an electromagnetic relay 134. At 135 there is an electric horn or other audible signaling device corresponding to the signal 59 of Figure 1. The circuits for the various devices may now be traced. The two main lead wires 138 and 139 are connected with any suitable source of power X. Wire 138 leads to a connector 139 on the speed responsive switch mechanism of unit B'. From the connector 139 there are two wires 140 and 141 leading to the spring fingers 120 and 121, respectively. Leading from the contact 123 is a wire 142 that leads directly to the pilot light 72. Wire 143 leading away from the pilot light connects to the other side of the supply line 139. The pilot light 72 is thus lighted the entire time that the switch 120, 123 is closed. As previously explained, this switch closes when the engine reaches about 80% of its normal speed and remains closed as long as the engine is operating at or above 80% of its normal speed. Another wire 144 leads from the wire 142 to wire 145. Wire 145 has one branch 146 leading to one contact of the pressure switch 77. It has another branch 146' leading to one side of the pressure-responsive switch unit 77'. The other side of the switches 77 and 77' are connected through the lamps 75 and 75' to wires 147 and 147', respectively, leading into the wire 148. Wire 148 is connected to one side of the relay 134. The other side of the relay 134 is connected through wire 149 with the line 139. The wire 145 has another branch 150 connected to one side of the electromagnet 131. The other side of the electromagnet 131 is connected through wire 151 to wire 152. Wire 152 goes to one contact of the relay 134. The movable contact of the relay 134 is connected through wire 153 to the wire 149 going back to the line 139. The wire 152 is also coupled to one side of the audible signal device 135 while the other side of the audible signal device is connected to the wire 145.

The operation of the system may now be followed. The speed-responsive unit B', of course, is connected with the Diesel engine or other power plant or other device to be controlled. When the engine reaches about 80% of its normal speed, the cam 116 will be rotated to a point where the switch 120—123 is closed. By the time the engine reaches this speed, the cooling water and the lubricating oil should be up to a pressure sufficient to raise the diaphragm 93 of the pressure-responsive switch and maintain the contacts 95 out of contact with the terminals 96 of the pressure-operated switches. As long as the engine speed does not exceed a predetermined maximum, and as long as the fluid pressure-responsive switches 77 and 77' are open, nothing occurs except that the pilot lamp 72 is lighted through the circuit comprising the speed-responsive switch 120—123, wire 142, lamp 72, wire 143, and back to the other side of the line 139.

If the fluid pressure fails in either of the switches 77 or 77', the circuit is closed across the terminals of the switch. If, for instance, the water pressure drops below normal, the switch 77 will close, in which case a circuit will be completed from the line 138 through the speed-responsive switch 120—123 and wire 142 to wire 144. From wire 144 the current path travels through wire 145 through wire 146 across the contacts of the pressure-responsive switch 77 through the lamps 75 to the wire 147. From the wire 147, the current path is through the wire 148, the winding of the relay 134 and wire 149 to the other side of the line 139. The completion of this circuit causes the visual signal at 74 to be lighted, indicating to the attendant that the water pressure is defective. At the same time, the completion of the circuit energizes the relay, closing the circuit through the audible signal 135. This serves to attract the attention of the attendant to the board. The closing of the circuit through the light 75 (or 75') also completes a circuit from wire 145 through the electromagnetic device 131 through the wire 151 to the wire 152, and from the wire 152 through contacts of the relay 134 back to the other side of the line. The energizing of the electromagnetic device 131 raises the armature 133, tripping the clock detent 130. This starts the clock into operation and the indicating hand 125 at the front of the panel starts to move toward the contact 129. If the operator can correct the difficulty before the contact finger 128 engages the contact 129, the pressure-responsive switch 77 will open, and all of the circuits will be restored to the normal condition. The opening of the circuit will also cause the electromagnet 131 to release its armature 133 and let the clock detent 130 drop back to its normal position. If the difficulty is not corrected by the time the contact finger 128 engages the contact 129, a circuit is immediately closed from the line 138 through wire 155, contact finger 128, contact 129, wire 156, wire 157, to the electromagnetic valve 100.

From the other side of the electromagnetic valve, the current path is completed to the other side of the line 139. The energizing of the valve of the electromagnetic valve immediately closes the valve. If this is the air intake valve of a Diesel engine, the engine is immediately stopped. The stopping of the engine, of course, stops the speed-responsive device B', the cam 116 drops back to open the switch 120—123 whereupon the pilot light, the visual signal and the audible signal are all de-energized, and the clock 127 is stopped by the energization of the electromagnet 131.

In the case of the engine reaching a speed which is above a predetermined maximum, the circuit will be completed from one side of the line 138 through the speed-responsive switch 121 to the wire 124, to wire 157. From wire 157, the current flows through the electromagnetic valve to the other side of the line 139. On a condition of over-speeding, the engine is thus immediately stopped.

It will be seen that the general functioning of the system as thus described is substantially the same as the system described in Figure 1. However, by the substitution of pressure-responsive switches, and speed-responsive circuit closers which avoid the use of mercury or other fluid, the system is better adapted to use on moving power plants, particularly those on boats and other floating equipment, such as dredges and the like.

In Figures 14 and 15, there is illustrated a slightly modified form of speed-responsive circuit-closing device adapted to the purposes of the present invention. In these figures, the governor is of the same type as that described in connection with Figures 7 to 11, inclusive. There is a governor casing 160. At the top of the casing, there is a transverse shaft 161 corresponding to the shaft 109 of Figure 11. The shaft 161 is rocked about its axis upon operation of the governor. Secured to the casing 160 is a box or housing 162, and the end of the shaft 161 projects into this housing. Secured to the end of the shaft 161 within the housing is an arm 163 having an outer portion 164 thereon which is insulated from the body of the arm as illustrated. This outer portion of the arm carries two brushes 165 and 166. Secured to one wall of the housing are two segments 167 and 168. Segment 167 has an insulated portion 167' and a conducting portion 167a. Segment 168 has an insulating portion 168' and a conducting portion 168a. When the governor is not operating or is operating below a predetermined minimum speed, say, for instance, 80% of normal, the brushes 165 and 166 ride on the insulated portions 167' and 168' of their respective segments. When the governor is operating at a predetermined speed, say, 80% of normal, the brush 165 rides onto the conducting portion 167a of its segment. The brush 166, however, still remains on a non-conducting part of its segment. When the brush 165 rides onto the conducting portion 167a, a circuit may be closed from the connector block 169 through flexible wire 170 to the brush 165. From this brush the circuit is completed through the conducting portion 167a and wire 171 to connector block 172. If the governor is operated above a predetermined normal speed, the arm 163 is rocked still further, bringing the brush 166 onto the conducting portion 168a of its segment 168. Then a circuit may be completed from the connector block 169 through the wire 170, brush 166 and conducting segment 168a to wire 173 to the connector block 174.

This arrangement provides a simple speed-responsive circuit closer in which no circuits are closed below a predetermined minimum speed, wherein one circuit is closed above minimum speed, and a second circuit closed above a maximum normal operating speed. It will be readily understood by those skilled in the art how this type of mechanism may be substituted for the double cam arrangement of Figures 7 to 9, inclusive.

As previously indicated, the invention is not restricted to Diesel engines, or internal combustion engines, but may apply to other driving units, and the term "engine control unit" as hereinafter employed is intended to include control units for any such prime mover.

It will be appreciated that the particular construction and arrangement of parts has been more or less diagrammatically shown, particularly Figure 1, and that various modifications and changes in the construction of the particular elements is contemplated under the invention.

I claim:

1. An engine control system comprising an electromagnetic engine control unit, a speed-responsive unit driven by the engine having a normal speed circuit closer and an over-speed circuit closer, a pressure-responsive circuit closer in series with the normal speed circuit closer, a time switch unit having an operating means in series with said normal speed circuit closer and said pressure-responsive circuit closer and having contacts operated by said operating means for closing a circuit from a source of current through said electromagnetic engine control unit, and a circuit through which said over-speed circuit closer and said electromagnetic engine control unit are connected with a source of current.

2. An engine control system comprising an electromagnetic engine control unit arranged to stop an engine upon energization thereof, a speed-responsive circuit closing device adapted to close a circuit when the engine is operating at normal speed, a pressure-responsive unit in series with said speed-responsive unit, a source of current, and an electrically energized normally open time switch mechanism in circuit with the control unit and with the source of current for energizing the same when it is closed and having means for closing the same connected in series with and under the control of said speed-responsive and pressure-responsive units, said last named means, the speed-responsive unit and the pressure-responsive unit being connected in series with the source of current.

3. An engine control system comprising an electromagnetic engine control unit arranged to stop an engine upon energization thereof, a speed-responsive circuit closing device adapted to close a circuit when the engine is operating at normal speed, a pressure-responsive unit in series with said speed-responsive unit, an electrically energized time switch mechanism connected with the control unit for energizing the same and under the control of said speed-responsive and pressure-responsive units, and a second speed-responsive element directly controlling the electromagnetic unit and arranged to close a circuit therethrough upon overspeeding of the engine.

4. An engine controlling system comprising an engine operated shaft having a centrifugal circuit closing means thereon operable to close a circuit at normal engine speed and a second circuit closing means operable to close a circuit only at super-normal engine speed, an electromagnetic engine control unit directly in circuit with said second circuit closing means, and a time switch and pressure-responsive switch through which said first circuit closing means energizes the control circuit.

5. A control mechanism for internal combustion engines comprising an air intake pipe for supplying air to the cylinders of the engine, a valve in said pipe adapted to close the same against the passage of air therethrough and which is normally open, an electromagnetically operated means through which the closing of the valve may be effected, a circuit closer operative only after a predetermined time interval in series with said electromagnetic means, and a pressure-responsive unit for controlling the actuation of the circuit closer.

6. A control mechanism for internal combustion engines comprising an air intake pipe for supplying air to the cylinders of the engine, a valve in said pipe adapted to close the same against the passage of air therethrough and which is normally open, an electromagnetically operated means through which the closing of the valve may be effected, a motor operated circuit closer in series with said electromagnetic means, a pressure-responsive unit for controlling the motor of said motor operated switch, and a speed-responsive switch in circuit with said pressure-responsive means arranged to prevent the closing of the switch motor circuit until the engine has reached a predetermined speed.

7. An engine control system comprising a plurality of pressure-responsive circuit closing units connected in parallel and adapted to respond to various pressure conditions in an engine to be controlled, a speed-responsive circuit closer adapted to be driven by the engine under control in series with said pressure-responsive circuit closing devices and arranged to close a circuit only when the engine is operated at a predetermined speed, a time switch in circuit with said speed-responsive circuit closer, and an electromagnetic engine control device under the control of said time switch.

8. An engine control system comprising a plurality of pressure-responsive circuit closing units connected in parallel and adapted to respond to various pressure conditions in an engine to be controlled, a speed-responsive circuit closer adapted to be driven by the engine under control in series with said pressure-responsive circuit closing devices and arranged to close a circuit only when the engine is operated at a predetermined speed, an electric motor connected with said speed-responsive circuit closer, a switch operated by the motor, and an electromagnetically controlled engine stopping unit in circuit with said switch.

9. An engine control system comprising a shaft adapted to be rotated by the engine under control, a pair of mercury tubes on the shaft one of which is set more nearly vertical than the other and having contacts therein, an electromagnetically operated engine stopping unit, a circuit connecting said engine stopping unit and the mercury tube which is most nearly vertical in series with a source of power, a time switch for connecting said electromagnetically operated engine stopping unit with a source of power after a predetermined time interval, a pressure-responsive circuit closer for operating the time switch and responsive to a pressure condition in the engine to be controlled, and a circuit connecting said pressure-responsive circuit closer in series with the other mercury tube on said shaft whereby the time switch can only be operated when said shaft is rotating.

10. An engine control system comprising a shaft adapted to be rotated by the engine under control, a pair of mercury tubes on the shaft one of which is set more nearly vertical than the other and having contacts therein, an electromagnetically operated engine stopping unit, a circuit connecting said engine stopping unit and the mercury tube which is most nearly vertical in series with a source of power, a time switch for connecting said electromagnetically operated engine stopping unit with a source of power after a predetermined time interval, a pressure-responsive circuit closer for operating the time switch and responsive to a pressure condition in the engine to be controlled, and a circuit connecting said pressure-responsive circuit closer in series with the other mercury tube on said shaft whereby the time switch can only be operated when said shaft is rotating, said pressure-responsive device being arranged to close a circuit upon a decrease in the pressure of the fluid to which it responds.

11. An arm safety stop system for a power mechanism comprising a stop unit for the power mechanism, electromagnetic means for operating said unit to stop the mechanism, a fluid pressure system for supplying lubricant and/or cooling water to said mechanism, a centrifugal circuit controller adapted to be driven by said mechanism, a pressure-responsive circuit closer in said fluid pressure system and in circuit with said centrifugal circuit controller, and which closes a circuit through said centrifugal circuit controller upon a failure of pressure in said fluid pressure system, a time switch mechanism controlled by the circuit through said centrifugal circuit controller and said pressure-responsive circuit closer, said time switch being connected in circuit with engine to be controlled, a fluid pressure switch unit adapted to be connected to a source of fluid pressure the maintenance of which is incident to the continued operation of the engine and which switch is held open by a predetermined fluid pressure and which is closed upon a reduction of pressure below the predetermined minimum, said speed-responsive switch being connected in series with the fluid pressure switch, and an electrically operated signal in circuit with said speed-responsive and fluid pressure circuit closing units.

21. An engine control system comprising an electromagnetically operated engine cut-off unit, a speed-responsive circuit closing unit driven by the engine to be controlled, a fluid pressure-responsive switch unit adapted to be connected to a source of fluid pressure, the maintenance of which is incident to the continued operation of the engine and which switch is held open by a predetermined fluid pressure and which is closed upon a reduction of pressure below the predetermined minimum, a time switch unit, and a circuit connecting the speed-responsive switch in series with the fluid pressure-responsive switch in series with the time switch unit, and another circuit connecting the time switch unit and the electromagnetically operated engine cut-off unit.

22. An engine control system comprising an electromagnetically operated engine cut-off unit, a speed-responsive circuit closing unit driven by the engine to be controlled, a fluid pressure-responsive switch unit adapted to be connected to a source of fluid pressure, the maintenance of which is incident to the continued operation of the engine and which switch is held open by a predetermined fluid pressure and which is closed upon a reduction of pressure below the predetermined minimum, a time switch unit, a circuit connecting the speed-responsive switch and the fluid pressure-responsive switch in series with the time switch unit, another circuit connecting the time switch unit and the electromagnetically operated engine cut-off unit, and a circuit including said speed-responsive switch and said fluid pressure switch and said signal device.

23. An engine control system comprising an electromagnetically operated engine cut-off unit, a speed-responsive circuit closing unit driven by the engine to be controlled, a fluid pressure-responsive switch unit adapted to be connected to a source of fluid pressure, the maintenance of which is incident to the continued operation of the engine and which switch is held open by a predetermined fluid pressure and which is adapted to close upon a reduction in pressure below the predetermined minimum, a time switch unit, an electric means in circuit with the speed-responsive unit, fluid pressure-responsive circuit closing units for setting the time switch into operation, and a circuit connecting the time switch and engine cut-off whereby the closing of the time switch effects the stopping of the engine.

24. An engine control system comprising an electromagnetically operated engine cut-off unit, a speed-responsive circuit closing unit driven by the engine to be controlled, a fluid pressure-responsive switch unit adapted to be connected to a source of fluid pressure, the maintenance of which is incident to the continued operation of the engine and which switch is held open by a predetermined fluid pressure and which is adapted to close upon a reduction in pressure below the predetermined minimum, a time switch unit, an electric means in circuit with the speed-responsive unit, fluid pressure-responsive circuit closing units for setting the time switch into operation, and a circuit connecting the time switch and engine cut-off whereby the closing of the time switch effects the stopping of the engine, all of said switches being of a type which functions in any position irrespective of gravity.

25. The combination with an engine stopping unit, of means for operating the unit when the engine reaches a predetermined maximum speed, and other means effective only when the engine has reached a predetermined speed for operating the engine stopping unit after a predetermined time following a failure of a predetermined fluid pressure supply to the engine being controlled by the engine stopping unit.

26. In a power plant system, an engine stopping unit, means operable to actuate the engine stopping unit upon overspeeding of the engine, and means operable only when the engine is running and upon a failure of a predetermined fluid pressure in the power plant system for stopping the engine only after a predetermined time interval following the failure of said pressure.

27. In a power plant system, an engine stopping unit, means operable to actuate the engine stopping unit upon overspeeding of the engine, means operable only when the engine is running and upon a failure of a predetermied fluid pressure in the power plant system for stopping the engine only after a predetermined time interval following the failure of said pressure, and means for indicating the failure of pressure prior to the stopping of the engine.

28. In a power plant system, an engine driven speed-responsive unit having two circuit closing devices thereon, one of which functions when the engine attains a predetermined minimum speed and one of which functions only when the engine exceds a predetermined maximum speed, an engine stopping device directly connected with said maximum speed circuit closing device for stopping the engine when an overspeed condition is reached, and means in circuit with said first-mentioned circuit closing device which is operative when the engine attains a predetermined minimum speed for indicating a failure of pressure in the power plant system only after the engine has reached said predetermined minimum speed.

29. In a power plant system a speed-responsive unit having two circuit closing devices, the first of which is rendered operable when the engine reaches a predetermined minimum speed and the second of which is rendered operable only after the engine has exceeded a predetermined maximum speed, an engine stopping unit directly under the control of said second circuit closing device, and a pressure responsive switch and a time switch operatively interposed between said first circuit closing device and said engine stopping unit whereby the engine may be stopped after it reaches a predetermined minimum speed upon failure of a predetermined pressure condition and after a predetermined lapse of time.

30. In a power plant system in which various fluid pressures have to be maintained after an engine reaches a predetermined speed, the combination with a plurality of pressure-responsive switches connected in parallel, of a speed-responsive switch connected in series with each of the pressure-responsive switches, and a signal device in circuit with each of the pressure-responsive switches and with said speed-responsive switch whereby said signal device may be operated when a predetermined pressure condition exists and when the engine is operating at a predetermined speed.

31. The combination with a fluid supply system for an internal combustion engine, of means responsive to variations in pressure in said system, signal means governed by said first means for indicating an abnormal pressure condition, and means whereby said second means may be rendered inoperative while the power plant is inoperative and until the power plant reaches a normal operating speed.

32. The combination with a fluid supply system for an internal combustion engine, of means responsive to variations in pressure in said system, and means controlled by said first means for closing down the plant only after a predetermined definite time interval following an abnormal pressure condition in said system.

33. The combination with a fluid supply system forming part of an internal combustion engine, of means responsive to variations in pressure in said system, signal means governed by said first means for indicating an abnormal pressure condition, and means controlled through said first means for closing down the plant only after a predetermined time interval following the operation of said signal means.

34. The combination with a fluid supply system for an internal combustion engine, of circuit controlling means connected to said system and responsive to an abnormal pressure variation in said system, and means controlled by said circuit controlling means for closing down the power plant only after a predetermined time interval following an operation of said circuit controlling means in response to an abnormal pressure condition in the system, said means including a cut-off device and a delayed acting control element therefor.

35. The combination with a fluid supply system for an internal combustion engine, of circuit controlling means connected to said system and responsive to an abnormal pressure variation in said system, means controlled by said circuit controlling means for closing down the power plant only after a predetermined time interval following an operation of said circuit controlling means in response to an abnormal pressure condition in the system, and a speed responsive unit for controlling said circuit controlling means whereby said circuit controlling means is rendered effective only after the plant has reached a predetermined operating speed.

36. The combination with a fluid supply system for an internal combustion engine, of circuit controlling means connected to said system and responsive to an abnormal pressure variation in said system, means controlled by said circuit controlling means for closing down the power plant only after a predetermined time interval following an operation of said circuit controlling means in response to an abnormal pressure condition in the system, said means comprising an engine cut-off device and a delayed acting control unit therefor and signal means controlled by said circuit controlling means and rendered operative immediately upon actuation of said circuit controlling means to indicate an abnormal pressure condition.

37. The combination with a fluid supply system for an internal combustion engine, of circuit controlling means connected to said system and responsive to an abnormal pressure variation in said system, means controlled by said circuit controlling means for closing down the power plant only after a predetermined time interval following an operation of said circuit controlling means in response to an abnormal pressure condition in the system, signal means controlled by said circuit controlling means and rendered operative immediately upon actuation of said circuit controlling means to indicate an abnormal pressure condition, and a speed responsive unit for controlling said circuit controlling means whereby said circuit controlling means is rendered effective only after the plant has reached a predetermined operating speed.

38. A control mechanism for an internal combustion engine having several ancillary systems the proper performance of which is necessary to the continued proper operation of the engine, said mechanism comprising a number of circuit controlling devices each responsive to one of said ancillary systems, an engine stopping device, and means under the control of said controlling devices for operating said engine stopping device upon the operation of one of said devices in response to a defect in one of the ancillary systems, and a speed responsive means for rendering said last means inoperative until the engine has reached a predetermined speed.

39. The combination with a plurality of circuit controlling devices operatively connected with certain ancillary systems of an internal combustion engine, of means effective only after an elapse of time for shutting down the engine, said means being under the control of said circuit controlling devices, and other means effective only when the engine is running for rendering said circuit controlling devices operative.

40. The combination with a plurality of circuit controlling devices operatively connected with certain ancillary systems of an internal combustion engine, of a speed-responsive means operated by the engine, means effective only after an elapse of time for shutting down the engine, said means being under the control of said circuit controlling devices, said circuit controlling devices in turn being under the control of said speed-responsive means.

41. A control system for an engine wherein the engine has an ancillary fluid system, the maintenance of which is necessary to the continued proper operation of the engine comprising a control device operatively connected into said fluid system and responsive to a defect in said system, means comprising an engine cut-off device and a timed control element therefor effective only after a predetermined period of time for stopping the engine, said means being under the control of said control device whereby the engine is stopped in a predetermined time interval after a defect occurs in the fluid system.

42. A control system for an internal combustion engine wherein the engine has an ancillary fluid system, the maintenance of which is necessary to the continued proper operation of the engine comprising a control device operatively connected into said fluid system and responsive to a defect in said system, means effective only after a predetermined period of time for stopping the engine, said means being under the control of said control device whereby the engine is stopped in a predetermined time interval after a defect occurs in the fluid system, and of means whereby said control device is rendered operative only while the engine is running.

43. An engine control system comprising an indicating panel having signals thereon for indicating the condition of certain ancillary fluid systems associated with the engine, means operable upon the starting of the engine for initially energizing the panel and upon the closing down of the engine for deenergizing the panel, an engine-stopping unit, and means in circuit with the signals for stopping the engine only after a predetermined lapse of time after any one of said signals indicates a defect in the ancillary system to which it responds.

44. A control mechanism for an internal combustion engine having several ancillary systems the proper performance of which is necessary to the continued proper operation of the engine, said control mechanism comprising a number of circuit controlling devices each connected with and responsive to one of said ancillary systems, an engine-stopping device, and means effective only after a predetermined lapse of time and under the control of each of said controlling devices for operating said engine-stopping device when a defect develops during the operation of the engine in any of said ancillary systems to which the controlling devices respond.

45. A control mechanism for an internal combustion engine having several ancillary systems the proper performance of which is necessary to the continued proper operation of the engine, said control mechanism comprising a number of circuit controlling devices each connected with and responsive to one of said ancillary systems, an engine-stopping means, means effective only after an elapsed period of time and under the control of each of said controlling devices for operating said engine-stopping means when a defect develops during the operation of the engine in any of said ancillary systems to which the controlling devices respond, and means whereby the controlling devices are rendered effective only while the engine is running.

GEORGE D. POGUE.